United States Patent [19]

Shinohara et al.

[11] Patent Number: 5,023,739
[45] Date of Patent: Jun. 11, 1991

[54] TAPE CASSETTE WITH A TRAPPING LAYER HAVING A CORROSIVENESS WHICH IS EQUAL TO OR HIGHER THAN THAT OF THE MAGNETIC RECORDING LAYER ON THE TAPE

[75] Inventors: Koichi Shinohara, Kobe; Takashi Suzuki, Takatsuki; Masao Kawagishi, Nara; Nobuo Satoh, Hirakata; Takeshi Murakami, Settsu; Takashi Fujita, Hirakata, all of Japan

[73] Assignee: Matsushita Electric Industrial Co., Ltd., Osaka, Japan

[21] Appl. No.: 308,765

[22] Filed: Feb. 10, 1989

[30] Foreign Application Priority Data

Feb. 15, 1988 [JP] Japan .................................. 63-32255
Mar. 11, 1988 [JP] Japan .................................. 63-58760

[51] Int. Cl.$^5$ ............................................. G11B 23/02
[52] U.S. Cl. ................................... 360/132; 360/137; 242/199
[58] Field of Search ................. 360/132, 137, 135; 242/198, 199

[56] References Cited

U.S. PATENT DOCUMENTS

| | | | |
|---|---|---|---|
| 4,170,788 | 10/1979 | Hashimoto et al. | 360/129 X |
| 4,467,382 | 8/1984 | Huisman | 360/137 |
| 4,765,563 | 8/1988 | Satoyoshi et al. | 242/199 |
| 4,769,730 | 9/1988 | Okamura et al. | 360/132 |
| 4,775,911 | 10/1988 | Sato et al. | 360/132 |

FOREIGN PATENT DOCUMENTS

| | | | |
|---|---|---|---|
| 49-27214 | 3/1974 | Japan . | |
| 54-48214 | 4/1979 | Japan | 360/132 |
| 58-98886 | 6/1983 | Japan | 360/132 |
| 59-119532 | 7/1984 | Japan . | |
| 59-207422 | 11/1984 | Japan . | |
| 60-93635 | 5/1985 | Japan . | |
| 61-5487 | 1/1986 | Japan . | |
| 61-48481 | 4/1986 | Japan . | |
| 61-131231 | 6/1986 | Japan . | |
| 61-139920 | 6/1986 | Japan . | |
| 61-142525 | 6/1986 | Japan . | |
| 61-153856 | 7/1986 | Japan . | |
| 61-162290 | 7/1986 | Japan . | |
| 61-242323 | 10/1986 | Japan . | |
| 61-250825 | 11/1986 | Japan . | |
| 61-280019 | 12/1986 | Japan . | |
| 61-284829 | 12/1986 | Japan . | |
| 62-8325 | 1/1987 | Japan . | |
| 62-205516 | 9/1987 | Japan | 360/132 |

OTHER PUBLICATIONS

IEEE Transactions on Magnetics, vol. 26, No. 1, Jan. 1990, "Corrosion of Particulate and Thin Film Media" by D. B. Speliotis.

Primary Examiner—Aristotelis M. Psitos
Assistant Examiner—Alfonso Garcia
Attorney, Agent, or Firm—Stevens, Davis Miller & Mosher

[57] ABSTRACT

A tape cassette for a magnetic recording tape having metallic magnetic recording layer is provided with a gas trapping layer which is disposed on a portion of the cassette near the path of the magnetic recording tape stretched between a pair of reels. The trapping layer has a trapping tendency which is at least equivalent to that of the magnetic recording tape. Any corrosive gas components coming into the cassette is adsorbed by and made to react with the trapping layer so as to reduce the concentration of the corrosive gas reaching the metallic magnetic recording layer, thus preventing degradation of the magnetic recording layer and ensuring that recording is conducted with high recording density.

17 Claims, 7 Drawing Sheets

TAPE CASSETTE WITH A TRAPPING LAYER HAVING A CORROSIVENESS WHICH IS EQUAL TO OR HIGHER THAN THAT OF THE MAGNETIC RECORDING LAYER ON THE TAPE

BACKGROUND OF THE INVENTION

1. Field of the Invention

The present invention relates to a magnetic tape cassette which is suitable for magnetic recording with a high density.

Nowadays, magnetic recording technology has achieved a great success and become one of the most popular recording techniques. The magnetic recording technology is mainly based upon magnetic flux differentiation and its development mainly owes to improvements in magnetic tape and magnetic head between which signals are exchanged.

Future development in the magnetic recording technology will essentially require a further increase in the recording density which in turns requires replacement of conventional oxide-type tape/head systems by metallic-type ones, and this is the reason why intense studies and developments have been achieved in the field of metallic magnetic tapes and magnetic heads for use in combination with such tapes.

Metallic magnetic tapes are broadly sorted into two types: namely, a so-called MP tape in which a dispersion of a ferromagnetic metal powder such as of iron or cobalt in a binder is applied to the surface of a polymeric film, and a so-called ME tape which is produced by forming a slant Co-Ni-O film by evaporation on a polymeric film. These two types of magnetic tapes are now widely used in 8 mm video apparatus and broadcasting instruments to cope with demands for higher recording density.

Metallic magnetic tapes also are considered to be essential for achieving high-density analog and digital recording and are expected to meet such requirements. Advances to a higher technological level are now being made through techniques for overcoming problems caused by shortening of wavelengths of recording signals, and shortcomings inherent in the tape material.

Among the problems and shortcomings mentioned above, the most critical problem to be overcome is socalled tribological problem, i.e., difficulty encountered in imparting durability to a magnetic recording layer which is finished with a high degree of smoothness in order to minimize spacing loss which becomes serious when signal wavelength is shortened. Another critical problem is that it is difficult to maintain a sufficiently large quantity of total magnetic flux and to prevent aging effects due to tape corrosion, when the tape thickness is reduced to improve the wavelength characteristic.

The following proposals (1) to (5) have been made to provide solutions to these problems.

(1) To reduce friction and wear by providing minute projections on the surface of the magnetic recording layer, as taught by, for example, IEEE TRANSACTIONS ON MAGNETICS Vol. MAG-21, No. 5, 1524-1526 (1985) and Japanese Patent Unexamined Publication Nos. 59-207422 and 61-284829.

(2) To make an effective use of a partial oxidation layer without allowing the magnetic part, i.e., metallic part, to be exposed, in order to improve resistance to corrosion and wear, as taught by, for example, Japanese Patent Publication No. 57-29770 and Japanese Laid-Open Patent Publication No. 61-153856.

(3) To attain a higher hardness of the material of the recording layer, thus improving resistance to wear and corrosion, as taught by, for example, Japanese Laid-Open Patent Publication Nos. 59-119532 and 61-139920.

(4) To employ a protective lubrication layer so as to prevent direct contact between the magnetic recording layer and the magnetic head or the like thus giving solution to wear and corrosion without modifying the magnetic recording layer itself, i.e., by allowing the magnetic recording layer and the protective lubrication layer to play their roles individually, as taught by, for example, Japanese Laid-Open Patent Publication Nos. 60-93635, 61-131231, 61-142525, 61-151830, 61-242323, 61-250825, 61-280019 and 62-8325, and Japanese Laid-Open Patent Publication No. 61-61444.

(5) To combine two or more of the proposals (1) to (4) above.

A magnetic tape improved by the arts described hereinbefore is usually set in a tape cassette when put to use. Most of known tape cassettes are assemblies of parts molded from plastics. Considerations are given to materials, design, easiness of assembly, mechanical characteristics, weather resistances and so forth of the tape cassette in accordance with requirements of various rules and regulations. The current trend for higher recording density essentially requires that tape cassettes have sealing or hermetic natures sufficient for preventing introduction of foreign matter so as to eliminate troubles such as drop-out and clogging. Cassettes having such sealing or hermetic effects are disclosed or mentioned in Japanese Laid-Open Utility Model Publication No. 57-9983, Japanese Laid-Open Utility Model Publication No. 58-109875, Japanese Laid-Open Patent Publication No. 51-5487, Japanese Laid-Open Utility Model Publication No. 61-48481, Japanese Laid-Open Patent Publication No. 61 162290, and Japanese Laid-Open Utility Model Publication No. 61-118175.

Accordingly, an object of the present invention is to provide a tape cassette which is capable of overcoming the above-described problems of the prior art.

To this end, according to the present invention, there is provided a tape cassette comprising a trapping layer having a corrosion tendency or corrosiveness equal to or greater than that of the magnetic recording layer of a metallic magnetic tape, the trapping layer being disposed in the vicinity of the path of the tape stretched between reels on which the tape ends are wound or in gaps which provide passages for external air coming into the cassette The trapping layer positively reacts upon selective adsorption of the corrosive gas components diffused into the cassette so as to retard deterioration of the magnetic recording layer attributable to corrosion.

BRIEF DESCRIPTION OF THE DRAWINGS

FIGS. 13(a) to 14(d) are illustrations of trapping layers;

DESCRIPTION OF THE PREFERRED EMBODIMENTS

Figure 1:
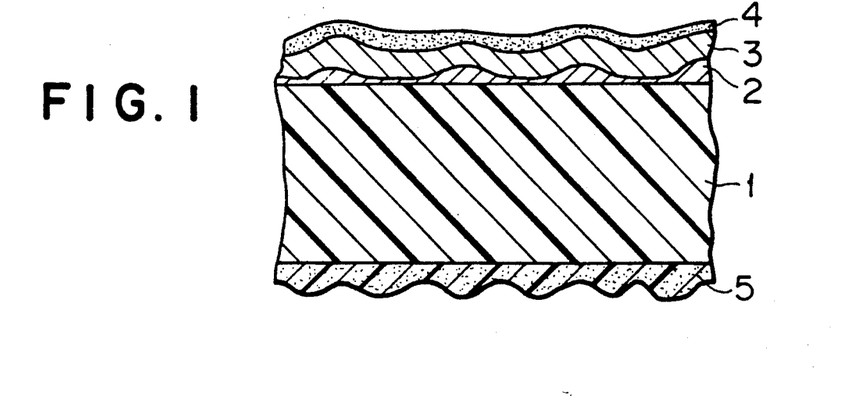
FIG. 1 is an enlarged sectional view of an ME tape set in an embodiment of the tape cassette in accordance with the present invention.

FIG. 1 is an enlarged sectional view of an ME tape cassette which is used in a tape cassette in accordance with the present invention for the purpose of evaluation. The ME tape shown in FIG. 1 has the following portions: a polymeric film 1 which is formed from, for example, polyethylene terephthalate, polyethylene naphthalate, polyphenylsulfide or the like; a fine particle layer 2 formed by applying fine particles such as of $Al_2O_3$, $SiO_2$, $Eu_2O_3$, CaO and $ZrO_2$; a magnetic recording layer 3 made from a ferromagnetic metallic film such as of Co-O, Co-Ni, Co-Cr, Co-Ti, Co-Si, Co-Cr-Nb, Co-Ni-O or the like; and a protective lubricant layer 4 which is formed by incorporating a lubricant such as a fatty acid, a perfuluorocarboxylic acid or perfluoropolyether in a protective film such as an $SiO_2$ film, a plasma polymerized film, a BN film or an amorphous carbon film, the thickness of the protective lubricant layer 4 being optimumly determined by taking into account the spacing loss. A reference numeral 5 denotes a so-called back coat layer which is formed by dispersing and mixing fillers such as carbon or calcium carbonate in resin for the purpose of improving a tape running characteristic. The magnetic tape having the described construction is slit into those having a narrower width of, for example, ¼ inch, 8 mm or 3.8 mm, or another suitable value of width. A leader tape and a trailer tape is attached to the leading end and the trailing end of the thus obtained magnetic tape and these ends are wound on respective reels which are set in a cassette, whereby the tape cassette is loaded with the magnetic recording tape.

The type of tape cassettes to which this embodiment of the present invention is highly effective are those having a high sealing ability but not those of the type which is, as is the case of video tape cassettes for domestic use, devoid of a rear lid and, hence, not fully enclosed.

Figure 2:
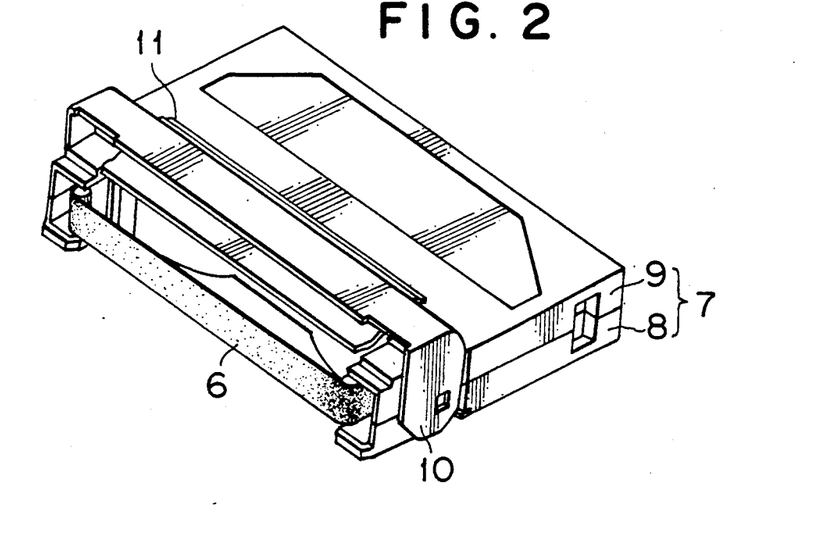
FIG. 2 is a perspective view of an 8 mm video magnetic tape cassette.
Figure 3:
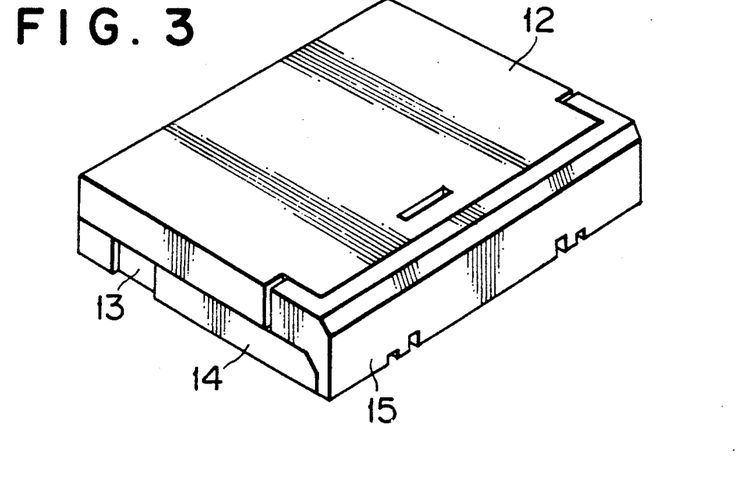
FIG. 3 is a perspective view of an R-DAT magnetic tape cassette.

Thus, the embodiment which is suitably loaded with the tape of the type shown in FIG. 1 has a certain degree of enclosing or sealing ability which is equivalent to that of known 8 mm video or R-DAT tape cassettes, as will be seen from FIG. 2. More specifically, FIG. 2 is a perspective view of an 8 mm video tape cassette The tape cassette has a main case 7 accommodating a magnetic tape 6, a A-case part (referred to as "lower half part" hereinafter) 8, a B-case part (referred to as "upper half part" hereinafter) 9, and a front lid 10 which is hinged to the upper half part 9 so as to selectively close the front opening in the main case 7. The tape cassette further has a rear lid 11 for protecting an exposed magnetic tape 6. On the other hand, FIG. 3 shows, in a perspective view, a tape cassette for R-DAT. This tape cassette has an upper case 12, a lower case 13, a slider 14 and a lid 15.

A practical embodiment of the present invention will be described hereinunder. An ME tape and an MP tape were used for the purpose of confirmation of effects produced by the present invention. A preparatory experiment showed that, though various MP tapes are produced and sold by various manufacturers, no substantial difference are appreciated among these tapes. A 60-minute tape produced from a company A was therefore used in the experiment. On the other hand, an ME tape of 8 mm wide was used which was prepared by a process comprising the steps of applying fine particles of $Eu_2O_3$ of 100 Å diameter to a polyethylene terephthalate film of 10 μm thick at a density of 10 particles in average per 1 $(\mu m)^2$, depositing by evaporation a Co-Ni Ni: 20 wt %) layer of 0.1 μm thick along a cylindrical can of 1 m diameter in an oxygen atmosphere of $5 \times 10^{-5}$ (Torr) to $1 \times 10^{-4}$ Torr and at a minimum incidence angle of 45°, forming a back coat layer of 0.5 μm on the side of the polyethylene terephthalate film remote from the Co-Ni layer by mixing carbonate and calcium carbide at a ratio of 1 : 1, dispersing 20 wt % of the thus obtained mixture in the polyurethane resin, adding isocyanate and a solvent into the mixture, and applying the mixture to the polyethylene terephthalate film followed by drying, and applying to the Co-Ni layer perfluorocarboxylic acid which is sold as "KRYTOX-157, FS-M" from Du Pont to a thickness of about 100 Å.

Experiment was conducted by setting these tapes in tape cassettes of the present invention, as well as comparison tape cassettes, and exposing the cassettes to various environment, and evaluation was made as to how the tape cassettes embodying the present invention are superior to the known tape cassettes (Comparison Examples) in regard to protection of the magnetic tapes.

Before the description of the results of the experiment, a detailed description will be given as to a trapping layer which has a corrosiveness equivalent to or greater than the magnetic tape, as the trapping layer provides an essential portion of the tape cassette in accordance with the present invention.

Generally speaking, testing methods or standards concerning the corrosiveness of a bulk material would be usable for the purpose of evaluation of the corrosiveness. The evaluation of the corrosion preventing effect on a magnetic tape, however, is conducted on a thin film or a coating film, while the trapping layer which is provided on the tape cassette and which has a function for absorbing corrosive gases can have various forms such as a bulk, thin film, coating film, formed member or the like. The inventors, therefore, considered that the evaluation will be made most appropriately by a method which simulates the actual process of corrosion which takes place in the course of use of a magnetic recording tape for the purpose of recording and reproduction on a deck which will be mentioned later. From this point of view, the inventors adopted the following evaluation method.

A glass container having internal volume of 20 l, having function for controlling temperature, humidity and corrosive gas concentration in the container, was prepared. A magnetic tape and a test piece were fixed on a holder at a distance of 10 cm from each other. The test piece carried a trapping layer arranged in the same manner as that in an actual tape cassette. The magnetic tape and the trapping layer were exposed for a predetermined time and the states of corrosion were observed by an optical microscope (magnification: 100). Evaluation was conducted in terms of ratio (%) of area of corrosion. In order to reduce the error, the temperature, humidity, kind and concentration of the corrosive gas were widely varied but the test results (area ratio) obtained through exposure to a gas containing 3 ppm of HCl at a temperature of 35° C. and humidity of 80% are shown as representative data in the following description of Examples. It is noted that the term "corrosiveness" is defined as the ratio of the corroded area (under the above-described conditions) to the overall area of the surface or layer under consideration. Actually, the corrosiveness of the trapping layer in dependence upon the concentration did not always conform with that of the magnetic tape and was varied depending on factors such as the material and production method of the trapping layer and other factors. However, it was found that the above-mentioned conditions for obtaining the representative data were enough for evaluating the effect of the invention and, hence, for determining the critical features of the present invention, and this is the reason why the representative data are selected and used in the following description.

EXAMPLE 1

Figure 4:
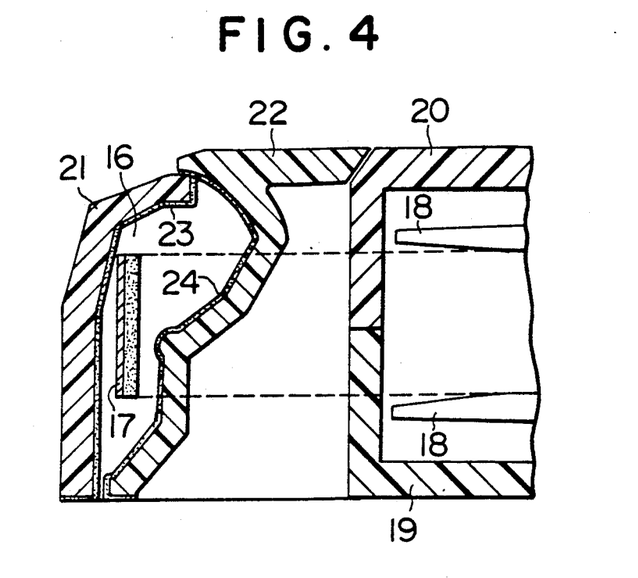
FIG. 4 is a longitudinal sectional view of an essential portion of an 8 mm tape cassette embodying the present invention.

FIG. 4 is a longitudinal sectional view of an 8 mm tape cassette used in a first Example of the present invention. This tape cassette accommodates an ME tape 16 having a Co-Ni-O magnetic layer 17 formed by evaporation. A numeral 18 denotes a reel flange; 19 a lower half part, 20 an upper half part, 21 a front cover, and 22 a rear cover. Numerals 23 and 24 denote, respectively, a trapping layer A-1 and a trapping layer A-2.

Thus, in Example 1, the trapping layer was placed on one of the inner surface of the rear cover, the inner surface of the front lid and a portion of a side wall. The results obtained with various materials of the trapping layer formed by high-frequency sputtering will be explained. A corrosion test was conducted by using, as a test piece, an ABS resin piece of 2 mm thick, 2 cm wide and 10 cm long, on which a trapping layer was formed in the same conditions as the condition of installation on the actual cassette. Before forming various types of thin film by sputtering, a glow-discharge process was conducted for 3 seconds at 13.56 MHz and 0.8 KW in an Ar atmosphere of $3 \times 10^{-2}$ Torr. Two samples are prepared which were composed of ME tapes incorporated in the above-described cassettes, as well as two comparison samples. The samples were left for 1 hour in a desiccator in which an atmosphere containing 50 ppm of HCl and held at a temperature of 35° C. and relative humidity of 80 to 83% was maintained. Then, the portions of the magnetic recording tapes ranging between the position 2 m ahead of the exposed tape portion and the position 2 m aback the exposed portion were subjected to a recording and playback process carried out by a commercially available 8 mm video tape recorder. The results of the recording/playback test process are shown in Table 1. The degree of drop-out is expressed in terms of increment ratio, while the clogging is expressed in terms of total hours. As explained before, two samples were tested for each of the tape cassette in accordance with the present invention and the tape cassette of Comparison Example, and the worst data of each case are shown in Table 1. Test was also conducted in regard to the MP tape. The results of such tests also are shown in Table 1. The sample, which employs Ni-O as the material of the sputtering, was prepared by forming a thin film by partial oxidation of $Ar + O_2$ gas.

Figure 5:
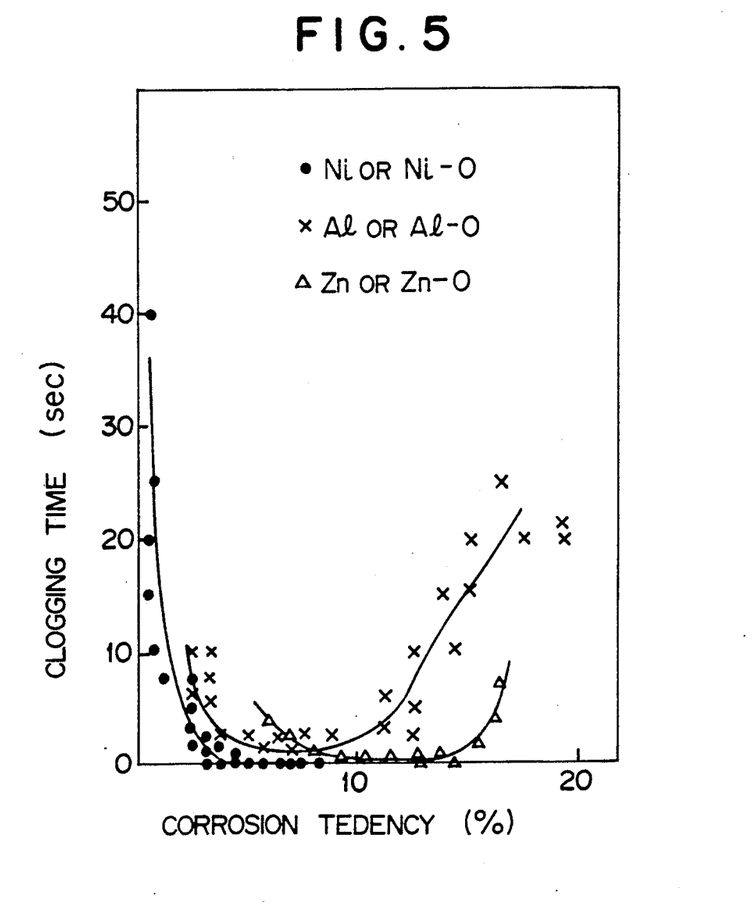
FIG. 5 is a graph showing the relationship between the corrosiveness tendency of a trapping layer and tendency of head clogging.

On the other hand, FIG. 5 shows the results of experiments conducted with trapping layers of Al and Al-O groups, as well as trapping layers of Zn type formed by sputtering, together with trapping layers of Bi and Ni-O systems other than those mentioned in Table 1. That is, FIG. 5 shows characteristic curves which indicate the relationship between the corrosiveness and the time of clogging giving a serious deffect. The data shown in FIG. 5 was obtained with a trapping layer A of 1.2 μm thick provided in a predetermined portion.

The following facts will be understood from the test results shown in Table 1. As compared with the tape samples 13 and 14, the ME and MP tapes used in the tape cassette of the present invention are protected even in a corrosive environment, by virtue of the trapping layer having a corrosiveness equivalent to or greater than that of the tested tapes. Unfortunately, however, the test results are rather unsatisfactory. This may be attributed to a fact that a too large corrosiveness of the trapping layer causes the effect of the trapping layer to be lost too shortly. From this point of view, the corrosiveness of the trapping layer should be selected range between a degree which is equivalent to that of the tape and a degree which is 5 times as high as that of the tape. This general condition, however, varies slightly depending on the tape of the corrosive gas, and the conditions should optimumly be selected through experiments.

Data shown in FIG. 5 suggests that there exists a suitable degree of corrosiveness tendency and that the trapping layer of Ni system produces a better result than the trapping layer of Al group.

TABLE 1

| | Tape | | Trapping layer A | | Trapping layer B | | Recording/playback characteristic | |
|---|---|---|---|---|---|---|---|---|
| | Type | Corrosiveness (%) | Material | thickness (μ) | Corrosiveness (%) | Material thickness (μ) | Corrosiveness (%) | Drop-out increment[*1] (%) | Clogging time (sec) |
| 1 | ME | 4.5~5.5 | Ni—O | 2.2~3.0 | — | | — | 150 | 51 |

TABLE 1-continued

| | Tape | | Trapping layer A | | Trapping layer B | | Recording/playback characteristic | |
|---|---|---|---|---|---|---|---|---|
| | Type | Corrosiveness (%) | Material thickness (μ) | Corrosiveness (%) | Material thickness (μ) | Corrosiveness (%) | Drop-out increment*[1] (%) | Clogging time (sec) |
| 2 | " | " | 1.2 Ni—O | 4.0~5.2 | — | — | 14 | 2 |
| 3 | " | " | 1.2 Ni | 7.2~8.1 | — | — | 10 | 0 |
| 4 | " | " | 1.2 Ni | 7.4~8.5 | — | — | 14 | 0 |
| 5 | " | " | 0.8 Ni—O | 2.0~2.9 | Ni 1.2 | 7.0~8.3 | 20 | 3 |
| 6 | " | " | 1.2 Al—O | 2.1~2.7 | — | — | 120 | 40 |
| 7 | " | " | 1.2 Al—O | 4.4~5.2 | Ni 1.2 | 7.1~8.0 | 5 | 0 |
| 8 | " | " | 1.2 Al | 15~19 | — | — | 54 | 20 |
| 9 | " | " | 1.2 Au | 1.1~1.4 | Ag 1.2 | 21~30 | 206 | 24 |
| 10 | MP | 3.6~4.5 | 1.2 Ni | 7~8.3 | — | — | 14 | 2 |
| 11 | " | " | 1.2 Al—O | 5.1~6.2 | — | — | 12 | 1.1 |
| 12 | " | " | 1.2 Al | 14~17 | — | — | 49 | 34 |
| 13 | " | " | — | — | — | — | 365 | 250 |
| 14 | ME | 4.5~5.5 | — | — | — | — | 305 | 123 |

*[1] Drop-out is given by a value per minute at 15 μsec and −16 dB drop-out as measured at a position during a period other than the clogging time.

EXAMPLE 2

A trapping layer was formed on the same portion as that in Example 1, by a method which is different from the method used in Example 1. ME and MP tapes were set in the thus prepared cassettes and exposed for 30 minutes to atmospheric gas containing 15 ppm of $H_2S$ and maintained at 30° C. and 80% relative humidity. The tapes after the exposure were subjected to a recording/playback test and the test results were evaluated in the same manner as that in Example 1.

The corrosiveness of the ME tape was adjusted to range between 3.6 and 4.4%, which is substantially equivalent to that of MP tape, through a control of the oxygen content.

A cassette 2A was prepared by forming the trapping layers A and B of Ni group by so-called chemical vapor deposition to a thickness of 3 μm, so as to subject Ni(CO$_4$) gas to a glow discharge decomposition at 13.56 MHz. The cassette 2B was prepared by forming Ni-type trapping layer having a thickness of through a 270° deflection electron beam evaporation conducted with a power of 10 KV and 16 KW in a vacuum of $1 \times 10^{-5}$ (Torr). The cassette 2C was prepared by a process comprising the steps of forming a dispersion mixture of urethane resin, Ni powder and an urethane oil, and applying by firing the mixture in such a condition that the resin in the set condition contains 50 vol % of Ni fine particles having a mean particle size of 0.2 μm. The cassette 2D was prepared by forming a non-electrolytic Ni plating having a thickness of 0.5 μm in a predetermined part after masking treatment by use of an acidic Ni bath containing 30 g/l of $NiCl_2 \cdot 6H_2O$, 10 g/l of $NaH_2PO_2$ and 50 g/l of $NaC_2H_3O_3$ and having a pH value ranging between 4 and 6. The configurations and sizes of the cassettes were adjusted in accordance with the plating thickness, in order that the cassettes may be detachably mounted in a video deck. Cassettes which have not been subjected to the abovementioned processes, as well as cassettes in which the plating was effected on all over the surface including the abovementioned plated part were prepared and evaluated as Comparison Examples although the cassettes plated over their entire areas are different in its technical idea, object and advantage from that of the tape cassette of the present invention.

More specifically, this type of tape cassette was prepared by plating the inner surfaces of the cassette with an Ni-Cr layer of 5.5 μm and the outer surfaces of the same with an Ni-Cr layer of 17 μm, as disclosed in Japanese Laid-Open Patent Publication No. 49-27214. Samples also were prepared in which the whole internal and external areas were plated with Ni layers of greater thicknesses than those mentioned above, considering that nickel has a smaller elastic modulus than the Ni-Cr alloy as taught by Japanese Laid-Open Patent Publication No. 49-27214. More specifically, the nickel plating layer was formed to have thicknesses of 8 μm on the inner surfaces and 20 μm on the outer surfaces. The results of the test are shown in Table 2.

TABLE 2

| | Tape | | Trapping layer | | Recording/playback characteristic | |
|---|---|---|---|---|---|---|
| | Type | Corrosiveness (%) | Construction | Corrosiveness (%) | Drop-out increment (%) | Clogging time (sec) |
| 1 | ME | 3.6~4.4 | 2A | 6.5~7.9 | 10 | 0.5 |
| 2 | " | " | 2B | 7.0~9.1 | 14 | 0 |

TABLE 2-continued

| | Tape | | Trapping layer | | Recording/playback characteristic | |
|---|---|---|---|---|---|---|
| | Type | Corrosiveness (%) | Construction | Corrosiveness (%) | Drop-out increment (%) | Clogging time (sec) |
| 3 | " | " | 2C | 5.5~7.1 | 7 | 0 |
| 4 | " | " | 2D | 6.8~7.8 | 5 | 0 |
| 5 | " | " | — | — | 405 | 64 |
| 6 | " | " | NiCr (entire surface) | 1.8~2.3 | 340 | 105 |
| 7 | " | " | Ni (entire surface) | 6.6~7.7 | 85 | 22 |
| 8 | MP | 3.6~4.5 | 2A | 6.5~7.9 | 11 | 1.5 |
| 9 | " | " | 2D | 6.8~7.8 | 7 | 2 |
| 10 | " | " | None | — | 500 | 250 |

The following facts are understood from the test results shown in Table 2. Namely, the Examples of the present invention produce superior effects both on the ME and MP tapes. On the other hand, the samples having Ni plating layers formed over the entire surfaces were rather inferior though the plating layers were formed to cover the areas of the trapping layers A and B. This is attributable to a fact that the trapping layer formed on the external side of the cassette progressively traps the corrosive gas so that the flow of air containing the corrosive gas around the cassette is enhanced so as to form an atmosphere of a high concentration of the corrosive gas, resulting in that the rate of introduction of the corrosive gas into the cassette is increased to enhance the probability of attack of the tape surface.

Figure 6:
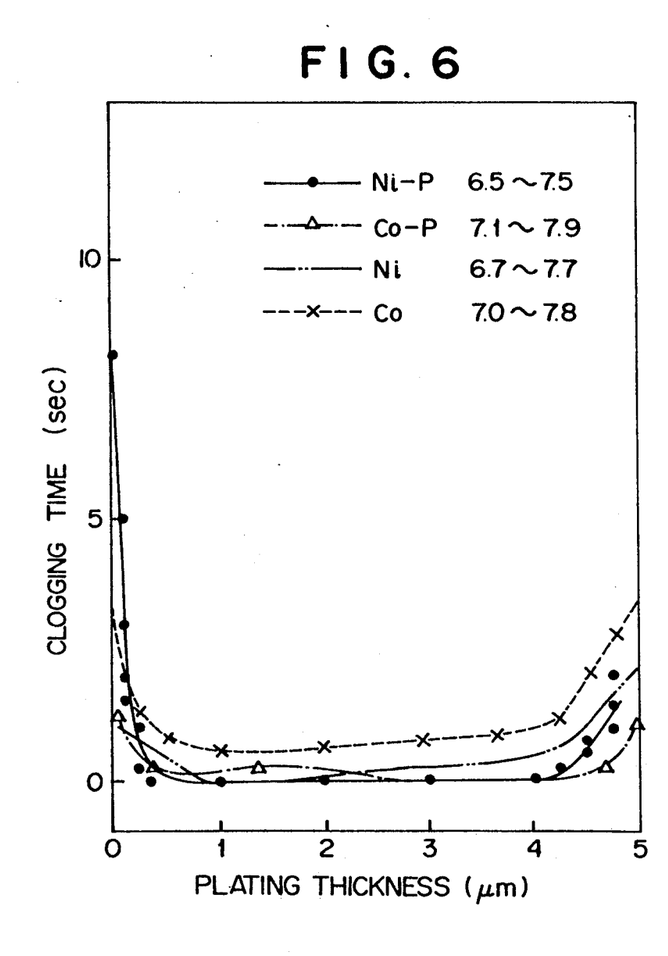
FIG. 6 is a graph showing the thickness of a trapping layer and clogging of a head.

FIG. 6 is a graph showing the effect of protection of the ME tape in relation to time as observed when the trapping layer A and the trapping layer B were formed by Ni, Ni-P, Co, Co-P plating with different thicknesses, respectively. From FIG. 6, it will be seen that appreciable effects are obtained when the trapping layer having a preferable thickness was formed on the inner surface and a portion of side walls. The range of the preferred thickness of the plating layer, however, differs according to factors such as the surface area and position of the trapping layer and the method of forming the trapping layer, and, therefore, should be determined during designing.

In general, however, an increment in the thickness of the trapping layer causes a problem in regard to distortion of the cassette, and as a result, the cassette parts are deformed to create gaps. From a synthetic point of view, therefore, the thickness should be determined to range between 0.5 and 4 $\mu$m. Another reason of the degradation in the protection effect caused by increment of the thickness of the trapping layer is a change in the structure of the trapping layer which causes peeling off of the same.

EXAMPLE 3

An Ni layer was formed by ion plating on the same portions as those in Example 1, while varying the areas of the front and rear covers on which the plating layer was formed. More specifically, a cassette 3A was prepared by effecting a glow discharge (13.56 MHz, 1 KW) in an argon gas atmosphere of $3 \times 10^{-3}$ Torr so as to form an Ni ion-plating layer having a thickness of 1.5 $\mu$m on a standard-type cassette composed of flat panels or walls. On the other hand, a cassette 3B was formed by effecting Ni ion-plating to form a layer of 1.5 $\mu$m thick on a surface having 10 grooves of 100 $\mu$m deep and 50 $\mu$m wide. Similarly, a cassette 3C was prepared by effecting Ni ion-plating to form a layer of 1.5 $\mu$m thick on a surface having 10 circular recesses of 50 $\mu$m diameter and 60 $\mu$m depth. An ME tape having a corrosiveness of 4.1 to 5.1% was loaded in cassettes of each of the types mentioned above. Similarly, an MP tape was loaded in the cassette of each of the types mentioned above. The thus prepared samples were exposed to each of atmospheres of 30° C. and 75% relative humidity containing 15 ppm and 1 ppm of a nitrate gas (NO$_2$), respectively. The exposed tapes were subjected to a recording/playback test, the results of which are shown in Table 3. The Ni ion-plating layer showed a corrosiveness of 6.2 to 6.9%.

TABLE 3

| | | Cassette condition | Recording/playback characteristic | | | |
|---|---|---|---|---|---|---|
| | | | NO$_2$ gas 1 ppm | | NO$_2$ gas 15 ppm | |
| | Tape | | Drop-out increment (%) | Clogging time (sec) | Drop-out increment (%) | Clogging time (sec) |
| 1 | | 3-A | 12 | 0.7 | 14 | 1.9 |
| 2 | ME | 3-B | 5 | 0 | 10 | 0.7 |
| 3 | | 3-C | 11 | 0.5 | 24 | 2.2 |
| 4 | | 3-A | 18 | 1.2 | 27 | 4.0 |
| 5 | MP | 3-B | 20 | 0.5 | 20 | 1.9 |
| 6 | | 3-C | 15 | 1.5 | 39 | 3.4 |

Figure 7:
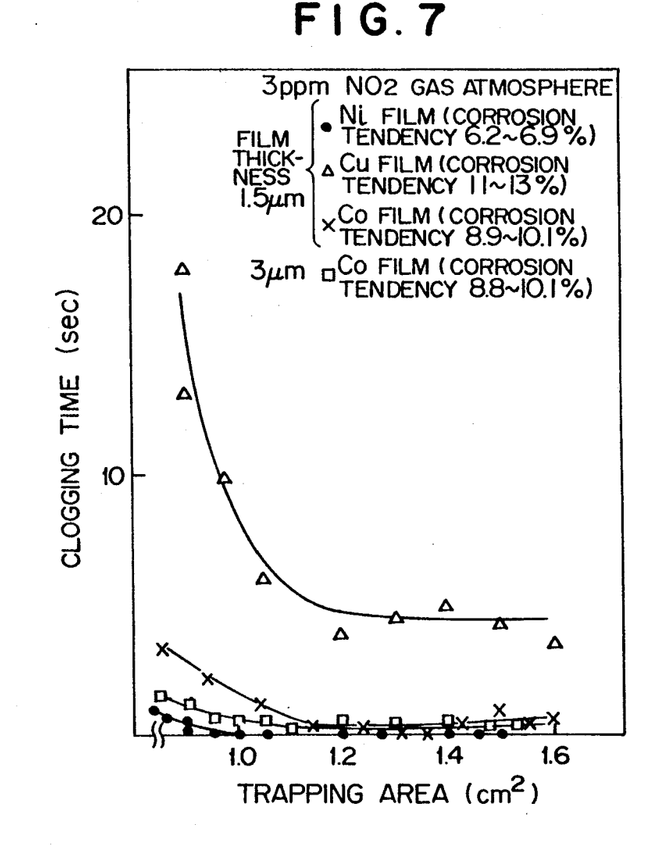
FIG. 7 is a graph showing the relationship between the surface area of a trapping layer and head clogging.

There is no substantial variation in the area of the trapping layer in the samples listed in Table 3. It is to be understood, however, that the smaller area of the trapping layer naturally reduces the trapping effect, as will be seen from the characteristic chart shown in FIG. 7. The trapping effect also varies depending on the thickness of the trapping layer. As a rule, however, the area of the trapping layer may be determined to be substantially equal to the area of the portion of the tape which is exposed, i.e., which is not wound on the reels.

This rule, however, is only illustrative, because the corrosion condition varies depending upon various factors such as the degree of enclosure or seal achieved by the cassette, atmosphere to which the tape is actually exposed, an exposure time, changes of the exposed portion of the tape due to tape feed, and so forth. Thus, the optimum area should be determined in accordance with the factors such as the material and production method of the trapping layer, a position or positions of the trapping layer, a structure of the cassette, the degree of the enclosing or sealing effect, and so forth.

Various methods can be taken for varying the surface area of the trapping layer, such as variation in the surface roughness, porous construction of the trapping material, the provision of minute reinforcement ribs on the surface to be plated, coarsening by etching, plating after embossing, and arraying metal whiskers on the surface. It has been confirmed by each of these methods can provide satisfactory result and may be selected as occasion demands.

EXAMPLE 4

Figure 8:
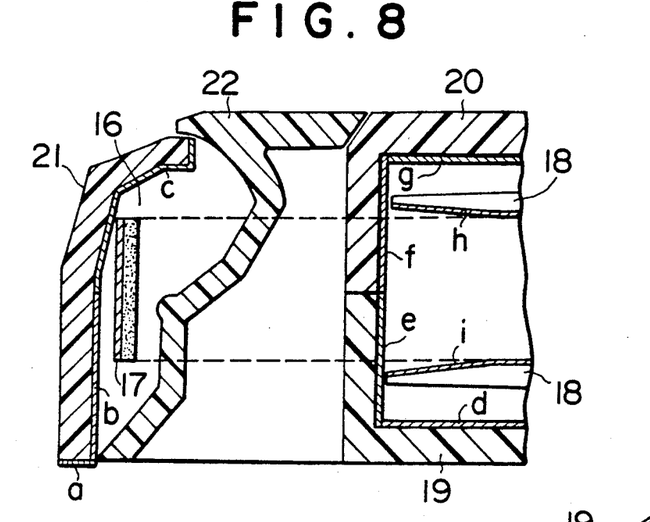
FIG. 8 is a longitudinal sectional view of an essential portion of an 8 mm tape cassette.
Figure 9:
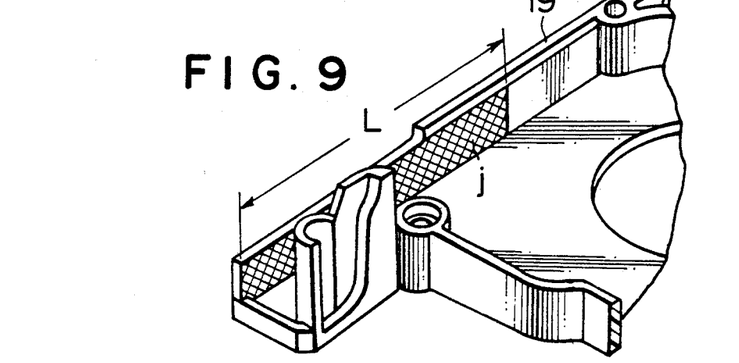
FIG. 9 is a perspective view of an essential portion of a lower half part of the tape cassette.

Non-electrolytic nickel plating was effected to form a trapping layer of 2 μm (corrosiveness 6.6 to 7.2%) on different portions of different cassettes. An ME tape having a corrosiveness of 3.4 to 4.1% was loaded in each of these cassettes. The cassettes thus loaded with ME tapes were exposed for 45 hours to a 2 ppm $SO_2$ gas atmosphere of 23° C. and 70% relative humidity and a 5.0 ppm $Cl_2$ gas atmosphere of 40° C. and 83% relative humidity and were then subjected to a recording/playback test. The results are shown in Table 4 for each of the positions of the plating layer. More specifically, a cassette A shown in Table 4 was plated by a length L of 1 cm in portions a, b and c on the front lid 21 (see FIG. 8) and a portion j of the lower half part (see FIG. 9) which faces the stretched tape portion. A cassette B is plated at the same portions as those of the cassette A, though the plating length L is 3 cm in this case. A cassette C is plated at portions a, b and c of the front lid 21 and a portion j of the length L of 3 cm shown in FIG. 9, as well as at a portion of the upper half part of the cassette corresponding to the portion j of a length L which also is 3 cm. A cassette D was prepared by conducting plating on a portion g of the upper half part and a portion d of the lower half part, besides the portions plated in the cassette C. In a cassette E, plating is effected on portions a and b of the front lid 21, as well as on portions e and d of the lower half part. In a cassette F, plating layer is formed on portions h and i of the tape-winding side of the take-up and supply reels. A cassette G is plated at portions d, e, f and g of the upper and lower half parts thereof. A cassette I is plated only at the portions d and g of the upper and lower half parts.

TABLE 4

| | Cassette | $SO_2$ gas | | $Cl_2$ gas | |
|---|---|---|---|---|---|
| | | Drop-out increment (%) | Clogging (sec) | Drop-out increment (%) | Clogging (sec) |
| 1 | A | 42 | 1.1 | 51 | 1.4 |
| 2 | B | 20 | 0.6 | 18 | 0.8 |
| 3 | C | 11 | 0.5 | 12 | 0.6 |
| 4 | D | 5 | 0 | 4 | 0 |
| 5 | E | 10 | 0.4 | 9 | 0.4 |
| 6 | F | 91 | 9 | 85 | 12 |
| 7 | G | 17 | 0.7 | 13 | 0.6 |
| 8 | No plating | 190 | 51 | 205 | 73 |

From Table 4, it will be understood that the Ni plating may fail to provide satisfactory effects depending on the positions. Namely, the test results shown in Table 4 suggest that, though the tape cassette 6 provides an effect which is improved as compared with the tape cassette 8 having no plated portion, at least one plated trapping layer is preferably disposed in the vicinity of the portion of the tape stretched between two reels.

EXAMPLE 5

Figure 10:
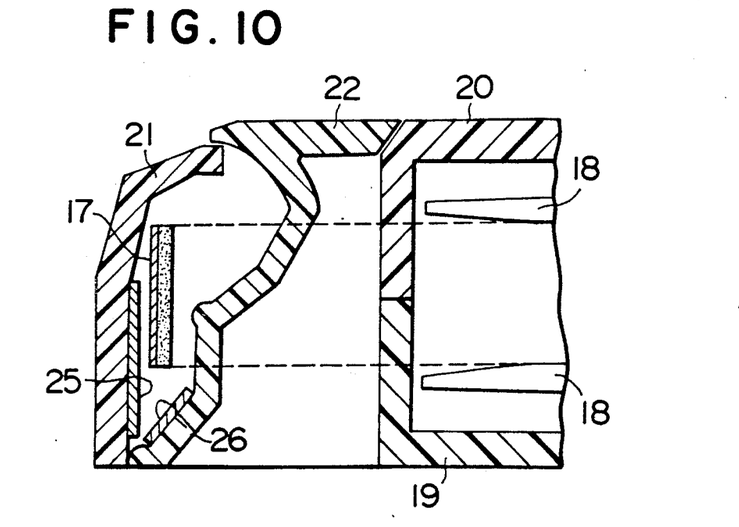
FIG. 10 is a longitudinal sectional view of an essential portion of an 8 mm tape cassette in accordance with the present invention.

FIG. 10 is a longitudinal sectional view of an essential portion of the 8 mm tape cassette used in the fifth Example. In this Figure, the same reference numerals are used to denote the same parts or members as those shown in FIG. 4. This sample employs a trapping layer formed on a portion of a flat part of the cassette in view of the fact that the flat portion is easy to metallize by various known metallizing methods. A reference numeral 25 denotes a trapping portion A which is provided on a flat portion of the inner surface of the front lid 21, while 26 denotes a trap portion B which is formed on a flat portion of the inner surface of the rear lid 22. Obviously, the positions of the trap portions A and B can be determined as desired by increasing a flat portion or by selecting a plurality of flat portions without violating the specification of the cassette. Thus, any change or modification of the design based upon the disclosed technical idea of the present invention is regarded as falling within the scope of the present invention. Thus, it is obvious to those skilled in the art to use different materials and methods for forming the trap portions A and B and to suitably combine such materials and methods. Although various such modifications are conceiveable, the most standard combination, i.e., trap portions A and B made of the same material and by the same production method, is employed in this Example.

More specifically, a cassette 5-1 employs a layer of Ni, SUS or Cr of about 1,000 Å formed by stamping foil, i.e., by hot stamping. A cassette 5-2 has an Ni layer of 1,000 Å thick formed by a so-called in-mold forming process using a stamping foil placed at the time of the injection molding. A cassette 5-3 has a layer of Ni or Zi of the mean film thickness of 0.7 μm by a so-called metal spraying method in which a metal molten by an arc discharge is atomized by a high-pressure argon gas. A cassette 5-4 is formed by bonding Ag, Al, or Ni by vacuum evaporation on a non-woven fabric. An ME tape having a corrosiveness of 4.3 to 5.1% was used in this Example. Since the corrosiveness of the film formed on the non-woven fabric as it is could not be evaluated, evaporation was effected also on a resin surface of the cassette to a thickness of 3,000 Å simultaneously with the evaporation on the non-woven fabric, and the values obtained with the evaporated film on the resin surface are shown.

The cassettes loaded with the ME tapes were exposed for 24 hours to a corrosive atmosphere containing 10 ppm of $Cl_2$ and 16 ppm of $SO_2$ and held at a temperature of 33° C. and relative humidity of 88%. The thus exposed tape cassettes were then subjected to a recording/playback test, the results of which are shown in Table 5.

TABLE 5

| | Cassette condition | Trap Material | Corrosiveness (%) | Drop-out increment (%) | Clogging time (sec) |
|---|---|---|---|---|---|
| 1 | 5-1 | Ni | 7.6~8.0 | 15 | 0.1 |
| 2 | | SUS | 6.4~6.9 | 17 | 0.35 |
| 3 | | Cr | 3.0~3.5 | 41 | 4.1 |
| 4 | 5-2 | Ni | 6.9~8.2 | 12 | 0 |
| 5 | 5-3 | Ni | 6.7~7.4 | 9 | 0.1 |
| 6 | | Zn | 11~12 | 11 | 0 |
| 7 | 5-4 | Ag | (19~23) | 74 | 1.9 |
| 8 | | Al | (16~18) | 29 | 3.0 |
| 9 | | Ni | (7.4~8.3) | 20 | 0.1 |
| 10 | Comparison Example | Nothing | — | 420 | 154 |

As will be seen from Table 5, the trapping characteristic is determined mainly by the material of the trapping layer rather than by the method of forming the trapping layer.

It is therefore advisable that the trapping layer is formed by using an optimum material, while selecting one of methods such as plating, painting, vacuum evaporation, chemical vapor deposition and so forth in consideration with, of course, the cost, process reproducibility, difficulty in variation of cassette dimensions, shape adaptability for a part to be processed and the like.

EXAMPLE 6

This Example was carried out for an R-DAT type tape cassette having an appearance as shown in FIG. 3. Trapping materials were placed in different conditions on the lid 15 (see FIG. 3) of a plurality of tape cassettes, and thus prepared cassettes were combined with ME tapes (corrosion tendency 3.8 to 4.3%) and MP tapes. The tape cassettes were exposed for 4 hours to a corrosive environment containing 3 ppm of $H_2S$ and 5 ppm of HCl and maintained at 30° C. and 83% relative humidity. Then the rate of change in the block error rate was measured.

A tape cassette 6-1 has a non-electrolytic Ni-P plating layer of 1.5 μm thick formed on the inner surface of the lid. A tape cassette 6-2 was prepared by spraying to the cassette surface a coating agent which has been developed by Shinto Chemitron Co., Ltd. for electromagnetic shielding purpose. More specifically, one of the samples of this tape cassette was applied with an acrylic paint (Shintron E-3315) layer incorporating a copper group filler to a thickness of about 5 μm, while the other sample was prepared by applying a paint (Shintron E-3063) layer containing a nickel-type filler to form a layer of about 5 μm. Samples of a tape cassette 603 were prepared by forming, by a sputtering evaporation, layers of Ni-Ti (Ni : Ti=1 : 1), Ni and Ti, respectively. Samples of a tape cassette 601 incorporate lids formed from a conductive ABS resin containing, as a filler, Ni powder and Al powder, respectively. The filler content was 25 to 27% by weight with respect to the resin.

Table 6 shows the results of the comparison between the above-mentioned tape cassettes and Comparison Examples. The R-DAT used in the measurement was a testing machine equivalent to commercially available one but the design thereof, was modified to facilitate the head cleaning. The R-DAT was initialized after each tape running so as to eliminate any error attributable to the sequence or order of the samples put into the test.

TABLE 6

| | Cassette | Trapping layer Material | Corrosiveness (%) | Recording/ playback characteristic Block error increment* (times) |
|---|---|---|---|---|
| 1 | 6-1 | Ni | 6.9~7.7 | 0.05 |
| 2 | 6-2 | Copper type | 13.5~16.6 | 0.3 |
| 3 | | Ni type | 5.5~6.4 | 0.3 |
| 4 | 6-3 | Ni—Ti | 4.9~5.7 | 0.9 |
| 5 | | Ni | 6.7~7.5 | 0.6 |
| 6 | | Ti | 8.2~9.5 | 2.3 |
| 7 | 6-4 | Ni powder | 4.5~5.6 | 0.8 |
| 8 | | Al powder | 11.0~12.4 | 4.1 |
| 9 | Comparison Example | — | — | 36 |

*Block error increment is shown in terms of increasing rate. Zero times indicates no variation.

Figure 11:
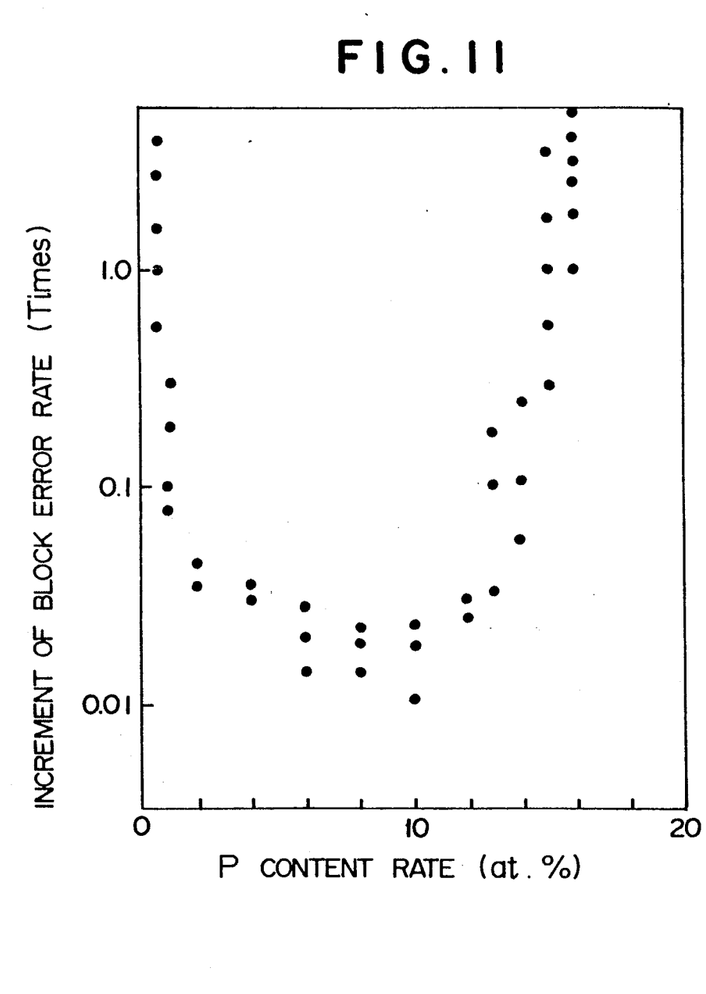
FIG. 11 is a diagram showing the relationship between P content of a trapping layer and increment of block error rate.

From Table 6, it will be understood that sample tape Nos. 1, 3, 4, 5 and 7 do not show substantial increment of the block error ratio. Sample tape Nos. 2, 6 and 8 also exhibit smaller increment of the block error rate so as to be more satisfatory than the Comparison Example. The non-electrolytic Ni-P plating mentioned in Table 6 shows the case where the P content is 4%. The P content also is a factor which causes a change in the effect. From FIG. 11 showing the manner in which the block error rate is increased, it will be seen that the P content preferably ranges between 2% and 12%.

A detailed description will be given of the case where the trapping layer is disposed mainly in a path of ambient air which is formed after the assembly of the cassette.

EXAMPLE 7

Figure 12:
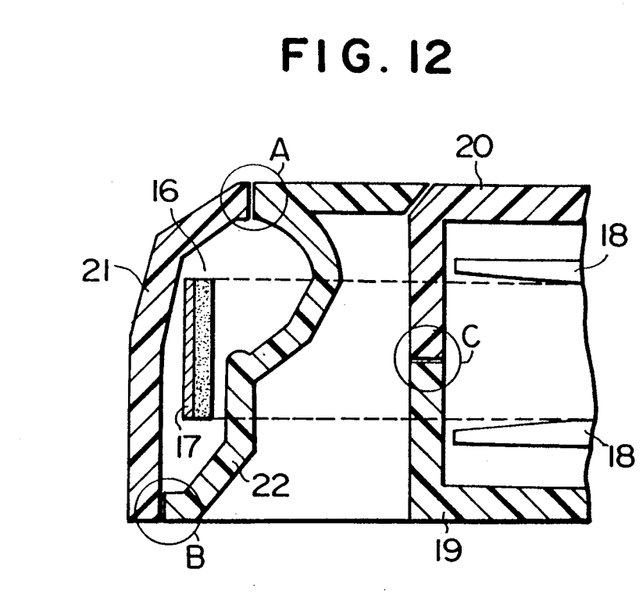
FIG. 12 is a longitudinal sectional view of an essential portion of an 8 mm tape cassette embodying the present invention.

FIG. 12 shows a longitudinal sectional view of an 8 mm video magnetic tape cassette used in the seventh Example of the present invention.

Referring to the figure, a Co-Ni-O magnetic layer 17 is formed on an ME tape 16 by electron beam evaporation. A numeral 18 denotes a reel flange, 19 a main case A, 20 a main case B, 21 a front cover, and 22 a rear cover. Although the cassette is constructed to provide a high degree of hermetic construction, gaps are left which provides passages for external air. The gaps left after the assembly of the tape cassette are broadly sorted into two types: gaps of substantially constant sizes formed between opposing parts (portion C) and gaps formed by parts which are movable during the use of the tape cassette and, hence, are variable (portions A and B).

Figure 13A:
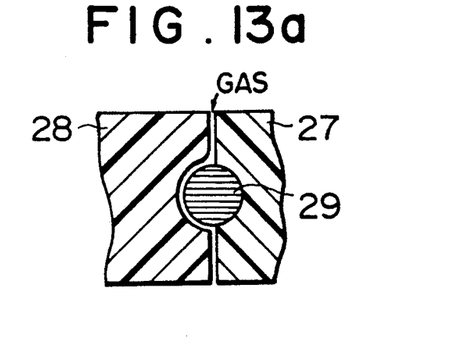
Figure 13B:
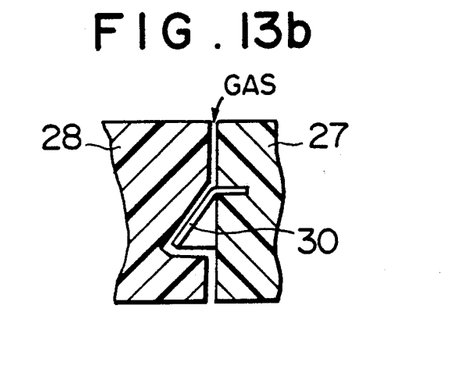
Figure 13C:
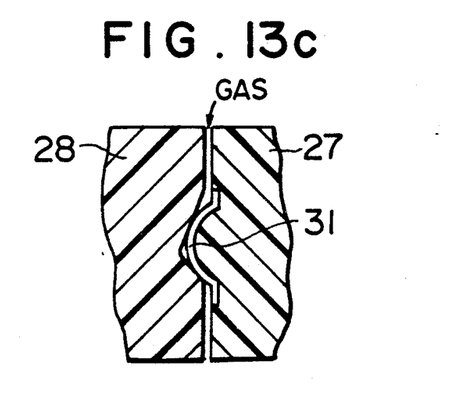

FIGS. 13(a) to 13(c) are illustrations of the manners in which a trapping layer is formed on a portion A or B shown in FIG. 12, while FIGS. 14(a) to 14(d) show the manners in which a trapping layer is formed on a portion C of FIG. 12. In FIGS. 13(a) to 13(c), a reference numeral 27 denotes a cassette part I, while 28 denotes a cassette part II. Trapping layers 29, 30 and 31 are disposed between these two parts I and II. Strong corrosive gas coming into the cassette housing is therefore adsorbed by and react with the trapping layers so that the gas becomes less corrosive before it reaches the internal structure, thus reducing the corrosive effect on the magnetic tape.

FIG. 13(a) shows an arrangement in which the trapping layer is composed of a metal single wire or a stranded wire, while FIG. 13(b) shows an oblique arrangement of a tabular material. In case of FIG. 13(c), the trapping layer is presented by an arcuately bent tabular member.

In each of the arrangements shown in FIGS. 14(a) to 14(d), a cassette part III and a cassette part IV are disposed to oppose each other leaving a gap therebetween. Trapping layers 34, 35, 36 and 37 are arranged in parts which statically form gaps. The trapping layer may be composed of a tabular member or a metallized film in the examples (a), (b), (c) and (d). It is also possible to form the trapping layer by directly metallizing a cassette part.

Obviously, other gaps in the 8 mm video cassette than those illustrated, providing passages for the external air coming into the cassette, are preferably provided with a trapping layer of the type as shown in FIGS. 13(a) to 13(c) and FIGS. 14(a) to 14(d), and the design should be done such as to minimize the sizes of these gaps.

Before describing the practical Example, description will be given of a procedure for determining the optimum condition and examples of test results.

Figure 15:
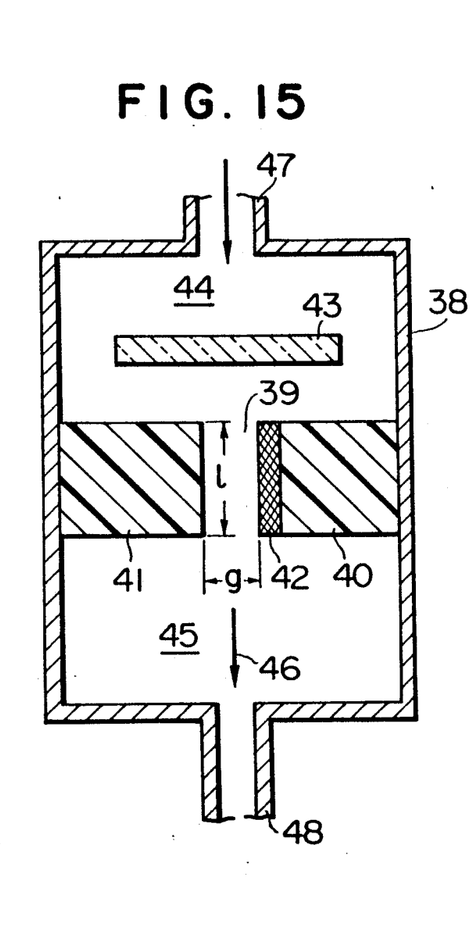
FIG. 15 is a schematic illustration of an apparatus used in an experiment for confirming the trapping performance of a trapping layer provided in a gap.

FIG. 15 is a schematic illustration of the testing apparatus employed in the test. The apparatus has a test container 38 with an equivalent external air passage in the form of a rectangular passage gap having a gap size g and a length l and a constant depth of 15 cm, the gap size g and the length l being variable. Numerals 40 and 41 denote, respectively, members corresponding to cassette parts. The members used in this experiment were made from an ABS resin. A numeral 42 designates a trapping layer. A numeral 43 designates a shield plate which is intended for diffusing the gas coming into the container. The shield plate 43 was formed of a pyrex glass sheet of 15 cm wide and 20 cm long. Upper and lower chambers defined in the container had equal internal volumes of 3.75 l, respectively. A numeral 46 denotes a gas sampling hole for measuring the gas concentration. Numerals 47 and 48 denote, respectively a gas inlet port and a gas outlet port, respectively.

An Ni-P (P content 3.3%) plate of 0.8 mm thick was used as the trapping material. An iron plate of 0.8 mm thick which plated with Zn to 3 μm on its both sides, also was used as another trapping material. A wet air containing 16 ppm at $SO_2$ was prepared by mixing air of 27° C. and 80% relative humidity with $SO_2$ gas. The thus prepared wet air was introduced into the container at a flow rate of 0.47 (l/min). The gas was sampled through the sampling hole, while varying the gap size g and the length l, and the trapping ratio in terms of the ratio of the rate of the $SO_2$ gas flowing into the container and the rate of the $SO_2$ gas flowing out of the container was measured.

Figure 16:
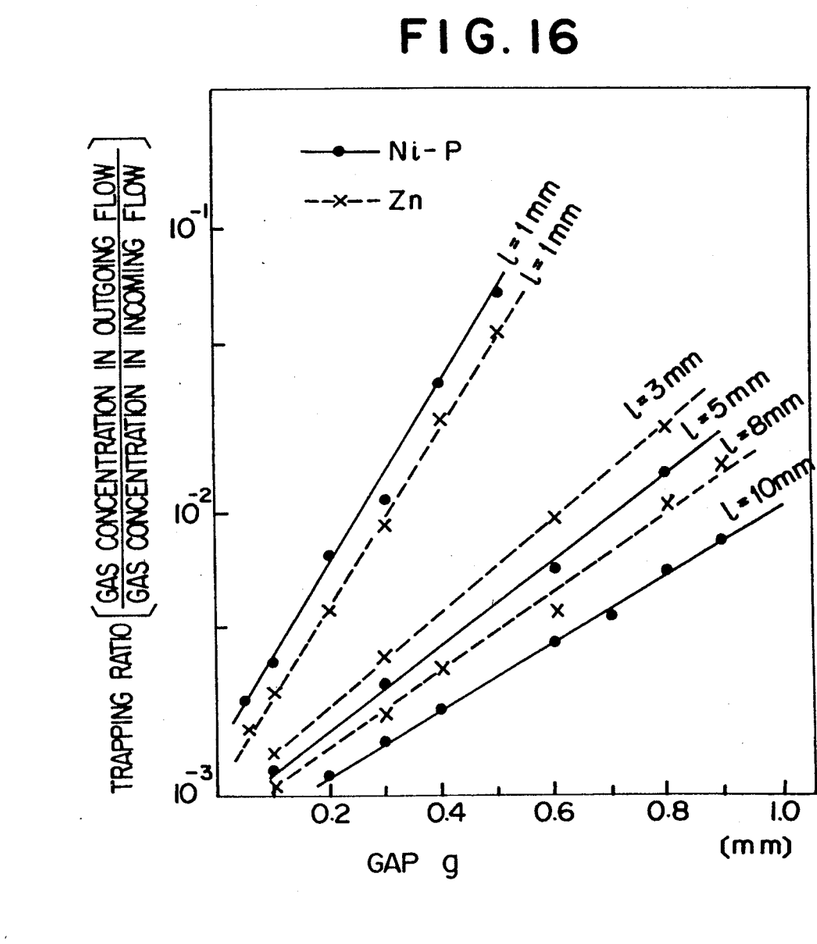
FIG. 16 is an illustration of the results of measurement of the trapping ratio.

FIG. 16 is a graph showing typical examples of the measuring results. As will be seen from FIG. 16, a shortening of the length l causes an increase in the dependency on the gap size g. This means that an improvement in the degree of sealing or hermetic effect is desirable when the arrangement of the test apparatus is applied to an actual cassette.

Data as shown in FIG. 16 obtained under various gas conditions and trapping layer conditions are collected and the design of the cassette is preferably made to attain a trapping ratio of $1 \times 10^{-2}$ or less in accordance with the thus collected data.

Figure 14A:
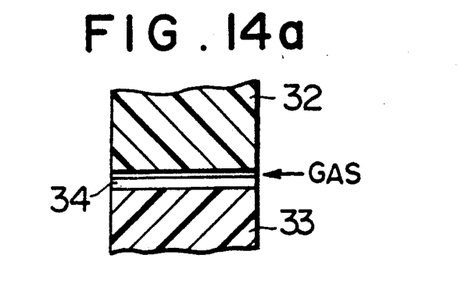
Figure 14B:
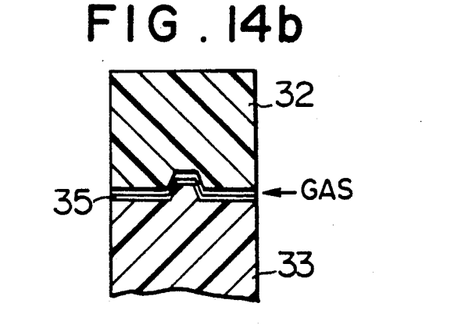
Figure 14C:
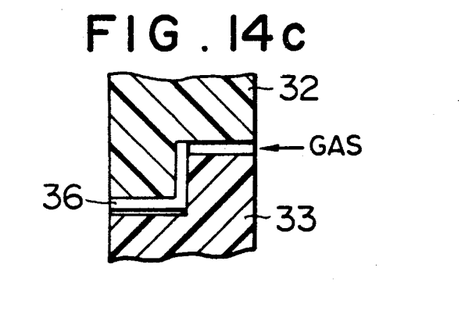
Figure 14D:
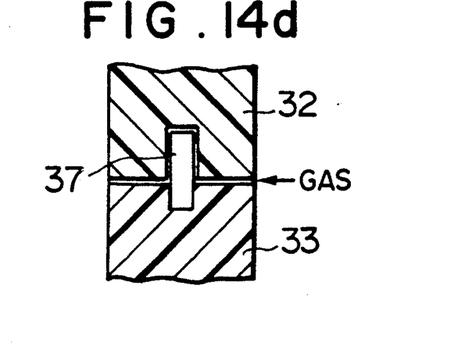

Sample cassettes were prepared by using the above-mentioned data and were left in various environmental conditions. The tape cassettes were then subjected to an evaluation test conducted with an actual video deck, the results of which will be described hereinunder. FIG. 14(b) shows a sealing structure in which the gap is considered as being constant. In this case, the trapping layer has a total length (length measured along the surface) of 2.2 mm, while the gap size is 0.15 mm or less (trapping ratio $2.6 \times 10^{-3}$). FIG. 13(b) shows a sealing structure of the front or rear lid which is opened and closed when the tape cassette is actually used. In this case, the plate 30 has a length of 2 mm while the gap size was selected to range between 0.2 mm and 0.18 mm (trapping ratio $4 \times 10^{-3}$). The trapping layer incorporated in the arrangement of FIG. 14(b) was a non-electrolytic Ni plating layer of 3 μm thick and containing 3% of P. In the arrangement shown in FIG. 13(b), an Ni plate containing 2.6% of, P was used.

The tape showed a corrosiveness of 4.8 to 5.1%, while the non-electrolytic Ni plating layer and the Ni plate showed a corrosiveness of 6.9 to 7.4% and 6.0 to 6.4%, respectively. Comparison examples were prepared in which a gold plating layer and an Ni plate plated with gold were substituted for the Ni-plating layer and the Ni plate used in the Example. The gold plating showed a corrosiveness of 0.4 to 0.6%.

Cassettes which had been left under different conditions of corrosive gas were mounted on an 8 mm video deck (produced by SONY, CCD-A300) and was subjected to a recording/playback process in which recording and playback were conducted over the entire length of the 120 minutes tape. Results of measurement of clogging time are shown in Table 7.

TABLE 7

| Storage condition | | | | Clogging time (min) | |
|---|---|---|---|---|---|
| Temperature & humidity | Corrosive gas | | Storage time (days) | Example | Comparison Example |
| | Type | Concentration (ppm) | | | |
| 40° C. 80% RH | HCl | 4 | 10 | 1/300 | 9 |
| " | $SO_2$ | 2 | 10 | 1/400 | 11 |
| " | $NO_2$ | 3 | 10 | 1/300 | 5 |
| " | $H_2S$ | 2 | 10 | 1/300 | 7 |
| 30° C. 85% RH | HCl | 5 | 20 | 1/450 | 10 |
| " | $SO_2$ | 6 | 20 | 1/400 | 13 |
| " | $NO_2$ | 5 | 20 | 1/400 | 9 |

EXAMPLE 8

A test was conducted to examine the storage stability by varying the material of the trapping layer by the same method as Example 7. The same comparison examples were used as those employed in Example 7. An ME tape having a corrosiveness of 4 to 4.6% was used as the test tape, while a tabular member, as well as a sputtered film in place of the plated film, was used as the trapping material. Test was conducted on five types of trapping layer materials: namely, Ni-Cu alloy (Monel), Mo, Co-Ni-P (Co : Ni : P=70 : 26 : 4 atomic %), Co-Sn (Co : Sn=95 : 5 atomic %), and Ni-Fe (Ni : Fe=20 : 80 atomic %). The degrees of the corrosiveness were 6.5 to 7%, 8.1 to 8.9%, 5.9 to 6.6%, 6.7 to 7.4% and 9.1 to 11.4%, respectively. The results of a test conducted on an actual video apparatus are shown in Table 8.

TABLE 8

| Storage condition | | | | Clogging time (min) | | | | | |
|---|---|---|---|---|---|---|---|---|---|
| Temperature & humidity | Corrosive gas | | Storage time (days) | Ni—Cu | Mo | Co—Ni—P | Co—Sn | Ni—Fe | Comparison Example |
| | Type | Concentration (ppm) | | | | | | | |
| 40° C. 80% RH | HCl | 6 | 10 | 0 | 1/200 | 0 | 1/300 | 1/400 | 12 |
| | $SO_2$ | 4 | 10 | 0 | 0 | 0 | 1/500 | 0 | 17 |
| | $NO_2$ | 5 | 10 | 1/500 | 1/300 | 1/400 | 0 | 0 | 9 |
| | $H_2S$ | 3 | 10 | 0 | 1/300 | 0 | 1/400 | 1/500 | 9 |
| | HCl | 2 | 10 | 1/300 | 1/400 | 1/450 | 0 | 0 | 19 |
| | $SO_2$ | 4 | | | | | | | |
| 30° C. 85% RH | HCl | 4 | 20 | 1/250 | 1/300 | 1/400 | 1/600 | 1/500 | 21 |

TABLE 8-continued

| Storage condition | | | | Clogging time (min) | | | | | |
|---|---|---|---|---|---|---|---|---|---|
| | Corrosive gas | | | | | | | | |
| Temperature & humidity | Type | Concentration (ppm) | Storage time (days) | Ni—Cu | Mo | Co—Ni—P | Co—Sn | Ni—Fe | Comparison Example |
| | SO$_2$ | 4 | | | | | | | |
| | HCl | 5 | 20 | 1/330 | 1/400 | 1/400 | 1/450 | 1/350 | 24 |
| | NO$_2$ | 5 | | | | | | | |
| | SO$_2$ | 3 | 20 | 1/370 | 1/330 | 1/270 | 1/300 | 1/300 | 20 |
| | NO$_2$ | 3 | | | | | | | |

EXAMPLE 9

In this Example, the Co-Ni-O film formed on a tape by evaporation was replaced by a Co-Cr (Cr: 20.5 wt %) vertically magnetized film of 0.1 μm thick formed by sputtering. This tape showed a corrosiveness of 2.0 to 2.3%. Arrangements shown in FIG. 14(a) to 14(d) were used for stationary fitting portion, while arrangements shown in FIG. 13(a) to 13(c) were used for abutting portions on the front and rear covers. The trapping layer was formed from an Fe-Ti alloy (Ti 15 atomic %) having a corrosiveness of 2.8%. The trapping layers used in the arrangements of FIGS. 14(a), 14(b), 14(c) and 14(d) were constructed to provide trapping ratios of $9 \times 10^{-3}$, $5.5 \times 10^{-3}$, $4.9 \times 10^{-3}$ and $3 \times 10^{-3}$, respectively. On the other hand, the trapping layers in the arrangements of FIGS. 13(a), 13(b) and 13(c) were arranged to provide trapping ratios of $7 \times 10^{-3}$, $4.2 \times 10^{-3}$, and $6 \times 10^{-3}$, respectively. Table 9 shows various combinations of the trapping structures and the results of the storage stability test. From Table 9, it will be seen that the samples of this Example exhibits a superior storage stability than the Comparison Examples which were prepared by replacing the Fe-Ti alloy of the trapping layer by an Ni-Cr alloy (Ni : Cr=40 : 60 atomic %) corrosiveness 1.7 to 1.9%).

TABLE 9

| Trapping layer construction | | Storage condition | | | | Clogging time | |
|---|---|---|---|---|---|---|---|
| | | | Corrosive gas | | | | Comparison |
| Front/rear lid | Stationary fitting | Temperature humidity | Type | Concentration (ppm) | Storage time (days) | Example (min) | Example (min) |
| a | a | 40° C. 80% RH | SO$_2$ | 5 | 10 | 0 | 9 |
| a | b | " | " | " | " | 0 | 8 |
| a | c | " | " | " | " | 0 | 5 |
| a | d | " | HCl | 7 | " | 0 | 6.5 |
| b | b | " | " | " | " | 0 | 9 |
| c | b | " | " | " | " | 0 | 8 |
| d | b | " | H$_2$S | 2 | 14 | 0 | 3 |
| b | c | " | " | " | " | 0 | 7 |

DAT cassettes and the small cassette of broadcasting MII FORMAT WHICH ARE SHOWN IN FIG. 3 were provided with trapping layers such that a mean trapping effect of $5 \times 10^{-3}$ is obtained. An ME tape of 3.8 mm wide and an ME tape of ½ inch wide were incorporated in these cassettes and tests similar to those mentioned in Examples 1 to 3 were executed under various conditions. Test results showed excellent storage stability of the tapes in these cassettes.

To sum up, according to the present invention, corrosive gas components coming into the cassette is adsorbed by and made to react with the trapping layer so as to reduce the concentration of the corrosive gas reaching the metallic magnetic recording layer, thus preventing degradation of the magnetic recording layer and ensuring that recording is conducted with high recording density.

What is claimed is:

1. A magnetic tape cassette comprising:
   a case in which a tape path is defined, said case including a case portion arranged adjacent to said tape path;
   a pair of reels rotatably disposed in said case;
   a magnetic tape having a magnetic recording layer made of a metallic magnetic material which is a Co-group alloy containing an additive element selected from a group consisting of Ni, Cr and O, said magnetic tape being wound on said pair of reels and stretched therebetween along said tape path;
   a trapping layer formed on said case portion, said trapping layer being oriented to face said magnetic recording layer of said magnetic tape and having a corrosiveness which is equal to or higher than that of said magnetic layer under a condition wherein said cassette is exposed to an atmosphere containing HCl having a concentration of about 3 ppm under a temperature of about 35° C. with a relative humidity of about 80 %, for 3 min.

2. A tape cassette according to claim 1, wherein said trapping layer is made from a material selected from a group consisting of Ni, Ni-P, Co-P and Zn.

3. A tape cassette according to claim 1, wherein said trapping layer is formed by plating.

4. A tape cassette according to claim 1, wherein said trapping layer has a corrosiveness ranging from 1.5 to 5.0 times as high as that of the magnetic recording layer.

5. A tape cassette according to claim 1, wherein said trapping layer is a metal-powder-containing resin layer.

6. A tape cassette as in claim 1, wherein said trapping layer is made from a material selected from a group consisting of Ni, Ni-P, Co-P and Zn.

7. A tape cassette as in claim 1, wherein said trapping layer is formed by plating.

8. A tape cassette as in claim 1, wherein said trapping layer has a corrosiveness ranging from 1.5 to 5.0 times as high as that of the magnetic recording layer.

9. A tape cassette according to claim 1, wherein said trapping layer is made of metal-powder-containing resin.

10. A magnetic tape cassette comprising:
a case in which a tape path is defined, said case including case portions defining a gap through which said tape path extends and through which ambient air enters into said case;
a pair of reels rotatably disposed in said case;
a magnetic tape having a magnetic recording layer made of a metallic magnetic material which is a Co-group alloy containing an additive element selected from a group consisting of Ni, Cr and O, said magnetic tape being wound on said pair of reels and stretched therebetween along said tape path;
a trapping layer formed on said case portions defining said gap so as to be disposed in said gap and having a corrosiveness which is equal to or higher than that of said magnetic layer under conditions wherein said cassette is exposed to an atmosphere containing HCl having a concentration of about 3 ppm under a temperature of about 35° C. with a relative humidity of about 80 %, for 3 min.

11. A tape cassette as in claim 10, wherein said trapping layer is made from a material selected from a group consisting of Ni, Ni-P, Co-P and Zn.

12. A tape cassette as in claim 10, wherein said trapping layer is formed by plating.

13. A tape cassette as in claim 10, wherein said trapping layer has a corrosiveness ranging from 1.5 to 5.0 times as high as that of the magnetic recording layer.

14. A tape cassette according to claim 10, wherein said trapping layer is made of metal-powder-containing resin.

15. A magnetic tape cassette comprising:
a case in which a tape path is defined, said case having a lower surface;
a lid means mounted on said case, said lid means having a lid inner surface and defining in cooperation with said case a space through which said tape path is extended, said lid means for closing and sealing said space from an ambient when said lid means is closed relative to said case and for opening said space to the ambient when said lid means is opened relative to said case,
a pair of reels rotatably disposed in said case;
a magnetic tape having a magnetic recording layer made of a metallic magnetic material, said magnetic tape being wound on said pair of reels and stretched therebetween along said tape path; and
a trapping layer formed on said lid inner surface, said trapping layer being oriented to face said magnetic tape and having a corrosiveness which is equal to or higher than that of said magnetic recording layer of said magnetic tape.

16. A tape cassette as in claim 11, wherein said lid means comprises a swingable lid member for covering a front side of said magnetic tape and a slide lid swingably attached to said lower surface of said case, said swingable lid member and said slide member cooperating to sealingly close said space.

17. A tape cassette according to claim 15, wherein said lid means includes a pair of swingable lid members adapted to sandwich said magnetic tape when said lid means is closed.

* * * * *